PCM DECODER WITH BIPOLAR OUTPUT

Filed Feb. 19, 1962

INVENTOR
A. HAMORI
BY R. B. Ardis
ATTORNEY 3,214,750

PCM DECODER WITH BIPOLAR OUTPUT

Andras Hamori, Cambridge, Mass., assignor to Bell Telephone Laboratories, Incorporated, New York, N.Y., a corporation of New York Filed Feb. 19, 1962, Ser. No. 174,168
4 Claims. (Cl. 340—347)

Figure 1:
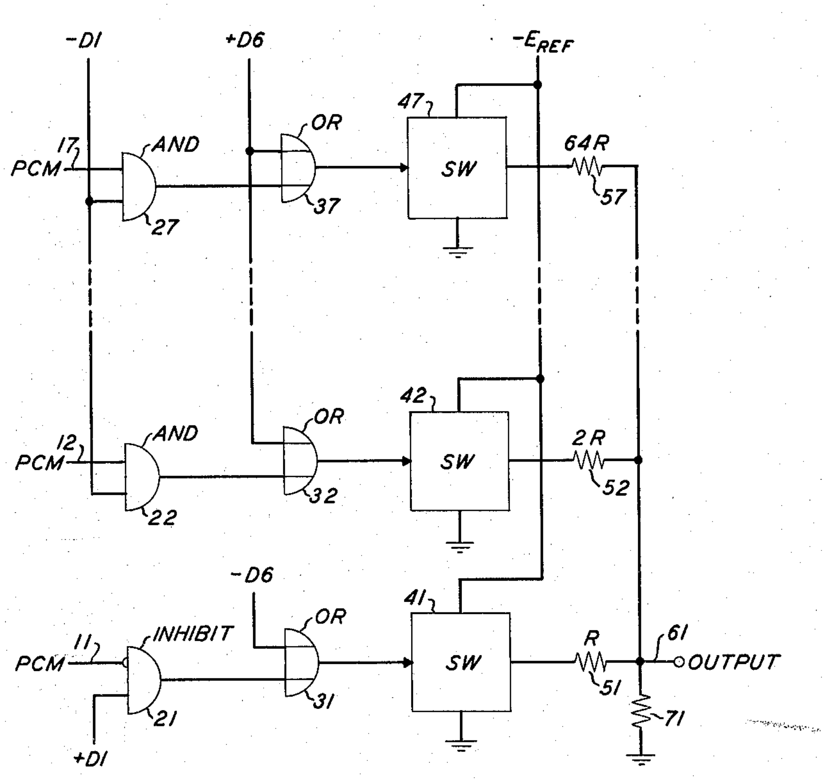

This invention relates generally to pulse type communication systems and more particularly to pulse code modulation communication systems, in which signal amplitude samples are converted to pulse code groups of binary "1" and binary "0" for transmission, usually in time division multiplex, and then reconstructed in substantially their original form from the received pulse code groups.

The process of reconstructing the original signal amplitude samples from the received pulse code groups in a pulse code modulation (henceforth referred to simply as PCM) system is known as decoding. In decoders of the so-called network type, each pulse code group is usually received in serial form, transferred to parallel form in some such apparatus as a shift register, and then used to control the transmission of current to a common output bus simultaneously through selected ones of a network of weighting resistors. Normally, each weighting resistor has a value of resistance dependent upon the mathematical significance of a different code group digit and is energized or not depending upon whether its digit is binary "1" or binary "0" in the particular pulse code group being decoded. The resulting signal amplitude samples reconstructed on the common output bus from a succession of PCM code groups in the usual decoder, however, are unipolar in form and possess a strong direct-current component of varying magnitude. Such unipolar samples are not suitable for application to other terminal circuits such as compandors, which are normally balanced with respect to ground. The direct-current component, moreover is blocked by transformers and series capacitors in the following circuitry and, without it, the individual samples in the reconstructed train cease to be accurate representations of their respective signals.

One existing arrangement for eliminating the varying direct-current component in a PCM decoder in reconstructing the signal amplitude samples in bipolar rather than unipolar form is disclosed in Untied States Patent 2,991,422, which issued July 4, 1961, to R. E. Yaeger. That arrangement makes use of a synchronous clamp and an auxiliary current supply resistor which cooperate with the decoding network to reconstruct the signal amplitude samples in bipolar form. While successful from a technical standpoint, it requires apparatus beyond that which is needed for the decoding function alone and thereby adds to the cost and complexity of the system.

A principal object of the present invention is, therefore, to simplify still further the circuitry needed in a PCM decoder for reconstructing the signal amplitude samples in bipolar form.

Another and more particular object is to reconstruct the signal amplitude samples in a PCM decoder directly in bipolar form without using additional clamps and current supply resistors.

The present invention makes possible the desired PCM decoder circuit simplification by switching only the network weighting resistors required for the decoding process itself in recreating the signal amplitude samples directly in bipolar form. In accordance with a principal feature of the invention, one of the network weighting resistors is connected from the common output bus to one side of the current supply source during time intervals between reconstructed samples and switched to the other side in response to a predetermined one of the two binary indications as its respective code group digit during reconstructed samples, while the remaining network weighting resistors are connected from the common output bus to the other side of the current supply source during time intervals between reconstructed samples and switched to the first side in response to the other binary indication as their respective code group digits during reconstructed samples. Opposite binary indications from those mentioned as their respective code group digits simply leave the network weighting resistors connected during reconstructed samples as they are during time intervals between reconstructed samples. The signal amplitude samples reconstructed on the common output bus of the decoder are thereby made bipolar about a potential intermediate between those of the opposite sides of the current supply source.

Another important feature of the invention permits the signal amplitude samples to be made bipolar about a potential substantially midway in their total amplitude range. In accordance with this feature of the invention, it is the network weighting resistor controlled by the most significant digit of each received PCM code group that is controlled differently from the others. The direct-current component of the reconstructed train of signal amplitude samples is thereby either reduced to substantially zero or converted to a form permitting its ready removal without adverse effect upon the accuracy of the samples.

Figure 2:
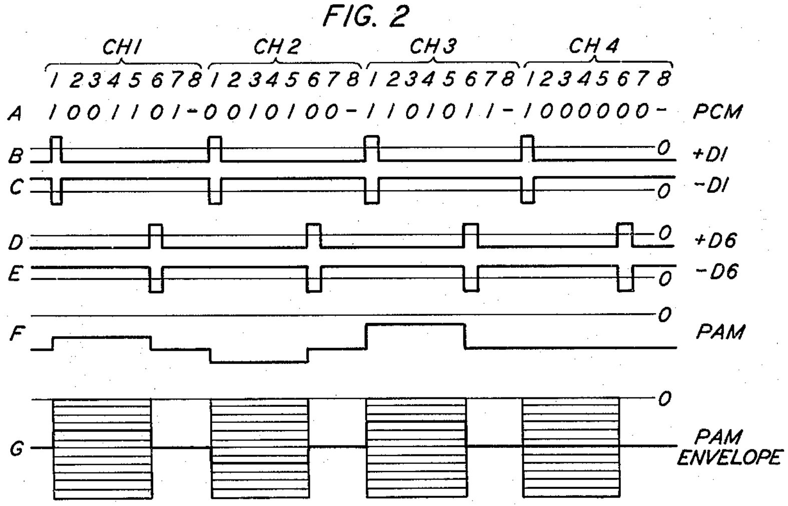

A more complete understanding of these and other features of the invention may be obtained from a study of the following detailed description of a specific embodiment. In the drawing:

FIG. 1 is a block diagram of the pertinent portions of a seven-digit PCM decoder embodying the invention; and FIG. 2 shows a series of waveforms illustrating the operation of the embodiment of the invention shown in FIG. 1.

In the PCM decoder illustrated in FIG. 1, the received pulse code groups have already been shifted from serial to parallel form by suitable apparatus such as that disclosed in the above-identified patent of R. E. Yaeger or that disclosed in the present inventor's Patent 3,160,874, which issued December 8, 1964. Thus, as part of a PCM system employing seven-digit code groups made up of binary "1" and binary "0" in successive digit spaces of descending mathematical significance, the illustrated decoder carries the contents of the first or most significant digit space on an input lead 11, the contents of the second or next most significant digit space on an input lead 12, and the contents of the seventh or least significant digit space on an input lead 17. The contents of other intermediate digit spaces of intermediate mathematical significance are carried in a similar manner, but their input leads and connecting circuits are not shown as they merely duplicate those shown for the second and seventh digit spaces. Input leads 11, 12, and 17 are labeled "PCM" to indicate that each carries the PCM pulses associated with its particular digit space of each code group. In the illustrated embodiment of the invention, each binary"1" in the incoming PCM pulse train is a negative pulse, while each binary "0" is a positive potential which also forms the base line of the pulse train.

In accordance with standard practice in PCM decoders, the PCM pulses in FIG. 1 have been delayed sufficiently from their original serial times of occurrence so that all appear substantially simultaneously on input leads 11 through 17. The reconstructed signal amplitude samples are thus delayed by approximately the length of a code group from the received code groups from which they are derived.

In the illustrated embodiment of the invention, the PCM pulses from the most significant or first digit spaces are applied by way of input lead 11 to the INHIBIT terminal of an INHIBIT gate 21. INHIBIT gate 21 passes positive-going timing pulses applied to its transmission terminal except when simultaneously accompanied by a negative-going PCM pulse at its INHIBIT terminal. The latter terminal is conventionally represented by the small semicircle.

Lines B, C, D, and E of FIG. 2 illustrate waveforms of the positive and negative-going timing pulses used to operate the embodiment of the invention shown in FIG. 1. At the top of FIG. 2 is an indication of the manner in which each PCM code group received in serial form is made up of combinations of binary "1" and binary "0" occupying seven consecutive message digit spaces. In a multichannel PCM system, each successive pulse code group is representative of a signal amplitude sample from a different message channel. Each successive group of eight digit spaces (the eighth, which may either precede or follow the message digit spaces, being reserved for the transmission of channel-busy or channel-idle information) is, for this reason, labeled with a different channel number. The timing waveforms illustrated in lines B, C, D, and E of FIG. 2 are synchronized with these digit spaces in the manner illustrated. The timing wave illustrated in line B is labeled +D1 to indicate that it contains a positive-going pulse during each first or D1 digit space. At all other times it is negative. The timing wave illustrated in line C is labeled —D1 to indicate that it contains a negative-going pulse during the same digit space. At all other times it is positive. The delayed parallel PCM pulses appearing on input leads 11 through 17 are timed to coincide with the +D1 and —D1 timing pulses. The timing waves illustrated in lines D and E of FIG. 2 are like those shown in lines B and C except that the respective positive and negative-going pulses occur during each sixth or D6 digit space and are labeled +D6 and —D6, respectively. The generator for producing the timing pulses used in conjunction with the embodiment of the invention illustrated in FIG. 1 is not shown, but it is conventional or may, alternatively, take the form of the timing pulse generator disclosed in United States Patent 2,984,706, which issued May 16, 1961, to H. M. Jamison and R. L. Wilson.

In FIG. 1, +D1 pulses are applied to the transmission terminal of INHIBIT gate 21. Except when inhibited by binary "1" from input lead 11 at the INHIBIT terminal, these +D1 timing pulses are transmitted to one terminal of an OR gate 31. OR gate 31, which passes pulses applied to either terminal, has another input terminal which is supplied with —D6 pulses. The output of OR gate 31 is applied to the control terminal of a switch 41 which operates to connect one side of a decoding network weighting resistor 51 either to a negative reference potential $-E_{REF}$ or to a second reference potential, ground. Switch 41 is preferably an electronic switch, such as the bistable multivibrator disclosed in the present inventor's above-identified copending application, which connects weighting resistor 51 to $-E_{REF}$ if its input terminal is positive or to ground if its input terminal is negative. The other side of weighting resistor 51 is connected to a common decoder output bus 61 and also returned to ground through a common load resistor 71.

The decoding network weighting resistor control path which has just been described is that for the most significant message digit. D1 and D6 timing pulses set the beginning and end, respectively, of each reconstructed signal amplitude sample on output bus 61. During digit time D1, a +D1 timing pulse provides a positive control potential on switch 41 which serves to connect weighting resistor 51 to $-E_{REF}$ unless it is inhibited by the presence of binary "1" on input lead 11. If binary "1" is present, nothing is passed along to switch 41 and it remains in the state it was in during the time interval between reconstructed time interval samples. It is thus binary "0" that causes switching action to take place. During digit time D6, a —D6 timing pulse provides a negative control potential on switch 41 which serves to shift weighting resistor 51 back to ground if it has been removed from there during digit time D1. The decoding network weighting resistor control paths for the remaining message digits differ from the one which has just been described in that, in accordance with an important feature of the invention, they are switched from their positions between reconstructed samples by the opposite binary indication, binary "1."

In FIG. 1, —D1 pulses are applied to one input lead of an AND gate 22, the other input lead of which receives second message digit PCM pulses from input lead 12. AND gate 22 passes pulses only when pulses appear on both input terminals simultaneosuly. The output from AND gate 22 is applied to one input terminal of an OR gate 32, the other input terminal of which is supplied with +D6 timing pulses. The output from OR gate 32 is supplied to the control terminal of a switch 42, which is substantially identical to switch 41 and connects one side of a second-digit weighting resistor 52 either to $-E_{REF}$ or to ground. The other side of weighting resistor 52 is connected to common output bus 61.

The least significant message digit weighting control path is substantially identical to the one controlling weighting resistor 52 and includes an AND gate 27, an OR gate 37, a switch 47, and a least-significant-digit weighting resistor 57. These elements are the same as AND gate 22, OR gate 32, switch 42, and weighting resistor 52 except that AND gate 27 is supplied with incoming seventh message digit PCM pulses from input lead 17 and weighting resistor 57 has a different value of resistance. The various decoding network weighting resistors are related to one another in resistance value by powers of 2. Thus, resistor 51 has a resistance value R, resistor 52 has a resistance value 2R, and so on through resistor 57, which has a value of 64R.

The control paths for all decoding network weighting resistors but resistor 51 operate in the same manner. During digit time D1, a —D1 pulse appears at the AND gate of each of these control paths but is not transmitted unless binary "1" is present at the same time on the corresponding input lead. If binary "1" is present, the —D1 timing pulse places a negative control voltage on the switch which shifts the weighting resistor from its between-sample connection to ground. Binary "1," in other words, causes the switching action to take place. If binary "0" is present on the input lead, the —D1 timing pulse is blocked and the switch is left in its between-sample state. During digit time D6, the +D6 timing pulse provides a positive control voltage which serves to shift the weighting resistor back to $-E_{REF}$ if it has been grounded during digit time D1.

The manner in which the illustrated embodiment of the invention operates to reconstruct signal amplitude samples on output bus 61 from different received code groups is illustrated in lines F and G of FIG. 2. Four different seven-digit code groups are shown in line A of FIG. 2 to provide examples. As illustrated, the first received PCM code group is 1001101. This is level 77 in binary notation and binary "1" is present in the most significant digit space. During digit time D1, therefore, weighting resistor 51 is left grounded. Of the other network weighting resistors, those associated with the second, third, and sixth digit spaces are left connected to $-E_{REF}$, since those digit spaces contain binary "0." The network weighting resistors associated with the fourth, fifth, and seventh digit spaces are switched to ground, however, since those digit spaces contain binary "1." The resulting signal amplitude sample reconstructed on output bus 61 is as illustrated at the left in line F of FIG. 2. This reconstructed sample is terminated during digit time D6 as weighting resistor 51 is left grounded and all others are either switched to or left connected to $-E_{REF}$.

The second received PCM code group in the example given in FIG. 2 is 0010100, which represents level 20 in binary notation. Since the most significant digit space contains binary "0" rather than binary "1," weighting resistor 51 is switched to $-E_{REF}$. The other network weighting resistors are switched or left alone in accordance with the contents of their respective digit spaces in the manner described.

The third code group in the illustrated example is 1101011, which represents level 107 in binary notation. Since the most significant digit space contains binary "1," weighting resistor 51 remains grounded following the between-sample guard space. As before, the other network weighting resistors are switched or left alone in accordance with the contents of their respective digit spaces.

The final code group in the illustrated example is 1000000, which represents level 64 in binary notation. This is a special case in the sense that all network weighting resistors are left unchanged from their positions during the time interval preceding the reconstructed sample. Binary "1" in the most significant digit space leaves weighting resistor 51 grounded, while binary "0" in the other digit spaces leaves the other weighting resistors connected to $-E_{REF}$.

The reconstructed signal amplitude samples illustrated in line F of FIG. 2 form a pulse amplitude modulated (PAM) pulse train, since it is the amplitude of each pulse or sample that now bears the transmitted intelligence. As shown, the base line of the pulse train is midway between the limits of the entire amplitude range of the samples. This latter point is made clear by line G of FIG. 2, which shows, super-imposed upon the waveform of line F, the envelope of the reconstructed PAM train as it would appear on the screen of a cathode ray oscilloscope. Although each reconstructed sample has only one amplitude at a time, successive samples in any channel tend to have different amplitudes and, over a period of time, those amplitudes are likely to vary over most of their possible range.

It is to be understood that the above-described arrangement is illustrative of the application of the principles of the invention. Numerous other arrangements may be devised by those skilled in the art without departing from the spirit and scope of the invention.

What is claimed is:

1. In a pulse code modulation decoder for reconstructing a succession of spaced signal amplitude samples from received binary code groups each composed of combinations of binary "1" and binary "0" occupying a predetermined number of digit spaces, an output bus for reconstructed signal amplitude samples, a plurality of current supply resistors equal in number to said predetermined number of code group digit spaces and each controlled by a respective one of said code group digit spaces, means connecting one of said resistors from said output bus to a first reference potential during each time interval between successive reconstructed samples, means connecting the remaining ones of said resistors in parallel with each other from said output bus to a second reference potential during each time interval between successive reconstructed samples, means for shifting the connection of said first-mentioned resistor from said first reference potential to said second reference potential in response to one binary indication in its respective code group digit space during each reconstructed sample, and means for shifting the connection of said remaining resistors from said second reference potential to said first reference potential in response to the other binary indication in their respective code group digit spaces during each reconstructed sample, whereby the reconstructed signal amplitude samples on said output bus are bipolar in character about a potential intermediate between said first and second reference potentials and said output bus returns to said intermediate potential during each interval between successive reconstructed samples.

2. In a pulse code modulation decoder for reconstructing signal amplitude samples from received binary code groups each composed of combinations of binary "1" and binary "0" occupying a predetermined number of digit spaces, an output bus for reconstructed signal amplitude samples, a plurality of current supply resistors equal in number to said predetermined number of code group digit spaces and each controlled by a respective one of said code group digit spaces, means connecting one of said resistors from said output bus to a first reference potential during each time interval between successive reconstructed samples, means connecting the remaining ones of said resistors in parallel with each other from said output bus to a second reference potential during each time interval between successive reconstructed samples, means for shifting the connection of said first-mentioned resistor from said first reference potential to said second reference potential in response to binary "0" in its respective code group digit space during each reconstructed sample, and means for shifting the connection of said remaining resistors from said second reference potential to said first reference potential in response to binary "1" in their respective code group digit spaces during each reconstructed sample, whereby the reconstructed signal amplitude samples on said output bus are bipolar in character about a potential intermediate between said first and second reference potentials and said output bus returns to said intermediate potential during each interval between successive reconstructed samples.

3. In a pulse code modulation decoder for reconstructing signal amplitude samples from received binary code groups each composed of combinations of binary "1" and binary "0" occupying a predetermined number of digit spaces of respectively different mathematical significance, an output bus for reconstructed signal amplitude samples, a plurality of current supply resistors equal in number to said predetermined number of code group digit spaces and each controlled by a respective one of said code group digit spaces and having a respectively different value of resistance, means connecting the curent supply resistor controlled by the most significant of said code group digit spaces from said output bus to a first reference potential during each time interval between successive reconstructed samples, means connecting the remaining curent supply resistors in parallel with each other from said output bus to a second reference potential during each time interval between successive reconstructed samples, means for shifting the connection of the current supply resistor controlled by the most significant of said code group digit spaces from said first reference potential to said second reference potential in response to one binary indication in said most significant code group digit space during each reconstructed sample, and means for shifting the connection of the remaining current supply resistors from said second reference potential to said first reference potential in response to the other binary indication in their respective code group digit spaces during each reconstructed sample, whereby the reconstructed signal amplitude samples on said output bus are bipolar in character about a potential intermediate between said first and second reference potentials and said output bus returns to said intermediate potential during each time interval between successive reconstructed samples.

4. In a pulse code modulation decoder for reconstructing signal amplitude samples from received binary code groups each composed of combinations of binary "1" and binary "0" occupying a predetermined number of digit spaces of respectively different mathematical significance, an output bus for reconstructed signal amplitude samples, a plurality of current supply resistors equal in number to said predetermined number of code group digit spaces and each controlled by a respective one of said code group digit spaces and having a respectively different value of resistance, means connecting the current supply resistor controlled by the most significant of said code group digit spaces from said output bus to a first reference potential during each time interval between successive reconstructed samples, means connecting the remaining current supply resistors in parallel with each other from said output bus to a second reference potential during each time interval between successive reconstructed samples, means for shifting the connection of the current supply resistor controlled by the most significant of said code group digit spaces from said first reference potential to said second reference potential in response to binary "0" in its respective code group digit space during each reconstructed sample, and means for shifting the connection of the remaining current supply resistors from said second reference potential to said first reference potential in response to binary "1" in their respective code group digit spaces during each reconstructed sample, whereby the reconstructed signal amplitude samples on said output bus are bipolar in character about a potential intermediate between said first and second reference potentials and said output bus returns to said intermediate potential during each interval between successive reconstructed samples.

References Cited by the Examiner

UNITED STATES PATENTS 2,718,634 9/55 Hansen.
2,986,727 5/61 Macklem.

MALCOLM A. MORRISON, *Primary Examiner.*